US012763486B2

(12) United States Patent
Chen et al.

(10) Patent No.: US 12,763,486 B2
(45) Date of Patent: Oct. 13, 2026

(54) POLARIZATION CONVERSION STRUCTURE AND ANTENNA

(71) Applicant: BOE Technology Group Co., Ltd., Beijing (CN)

(72) Inventors: Shaopeng Chen, Beijing (CN); Feng Qu, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 134 days.

(21) Appl. No.: 18/699,597

(22) PCT Filed: Aug. 3, 2023

(86) PCT No.: PCT/CN2023/111062
§ 371 (c)(1),
(2) Date: Apr. 9, 2024

(87) PCT Pub. No.: WO2025/025221
PCT Pub. Date: Feb. 6, 2025

(65) Prior Publication Data
US 2025/0226589 A1 Jul. 10, 2025

(51) Int. Cl.
*H01Q 15/24* (2006.01)

(52) U.S. Cl.
CPC .................................. *H01Q 15/242* (2013.01)

(58) Field of Classification Search
CPC .... H01Q 15/242; H01Q 9/0414; H01Q 21/24; H01Q 15/24
See application file for complete search history.

(56) References Cited

U.S. PATENT DOCUMENTS

2017/0117633 A1* 4/2017 Park ..................... H01Q 9/0428
2019/0067806 A1 2/2019 Xu et al.

FOREIGN PATENT DOCUMENTS

CN 107257030 A 10/2017
CN 109193169 A 1/2019
(Continued)

OTHER PUBLICATIONS

Fu et al., Design of high-efficiency broadband dual-polarization converter based on metasurface, Journal of Optoelectronics • Laser, vol. 33 No.7, Jul. 2022, DOI:10.16136/j.joel.2022.07.0796.
(Continued)

*Primary Examiner* — Dieu Hien T Duong

(57) ABSTRACT

Provided are a polarization conversion structure and an antenna. The polarization conversion structure includes a ground structure layer (11), a first dielectric substrate (21) and a radiation structure layer (300) which are stacked in a direction perpendicular to a plane where the polarization conversion structure is located. The radiation structure layer (300) includes at least one radiation unit (30), the radiation element (30) includes a radiation structure (31), and the radiation structure (31) is arranged symmetrically with respect to a first centerline, wherein the first centerline is a centerline of the radiation structure (31) extending in a fourth direction on a plane parallel to the polarization conversion structure. Orthographic projections of the radiation unit (30) and the ground structure layer (11) on the first dielectric substrate (21) are at least partially overlapped.

14 Claims, 11 Drawing Sheets

(56) References Cited

FOREIGN PATENT DOCUMENTS

| | | | | | |
|---|---|---|---|---|---|
| CN | 109672023 | A | | 4/2019 | |
| CN | 109786976 | A | * | 5/2019 | |
| CN | 111628296 | A | | 9/2020 | |
| CN | 111834752 | A | | 10/2020 | |
| CN | 111903001 | A | | 11/2020 | |
| CN | 113013640 | A | | 6/2021 | |
| CN | 113644451 | A | * | 11/2021 | ......... H01Q 15/0086 |
| CN | 114069256 | A | | 2/2022 | |
| CN | 114336023 | A | | 4/2022 | |
| CN | 114843789 | A | | 8/2022 | |
| CN | 114843793 | A | | 8/2022 | |
| CN | 116505275 | A | | 7/2023 | |
| WO | 2023070350 | A1 | | 5/2023 | |

OTHER PUBLICATIONS

Zhang et al., Dual-Band Wide-Angle Reflective Circular Polarization Converter with Orthogonal Polarization Modes, Sensors 2022, 22, 9728.

Pouyanfar et al., Multiband and multifunctional polarization converter using an asymmetric metasurface, Scientific Reports, (2021) 11:9306.

Office Action dated Dec. 31, 2025 for CN 202380009998.9 and English Translation.

* cited by examiner

POLARIZATION CONVERSION STRUCTURE AND ANTENNA

CROSS-REFERENCE TO RELATED APPLICATION

The present application is a U.S. National Phase Entry of International Application No. PCT/CN2023/111062 having an international filing date of Aug. 3, 2023, the entire content of which is hereby incorporated by reference.

TECHNICAL FIELD

Embodiments of the present disclosure relate to, but are not limited to, the field of communication technology, and in particular, to a polarization conversion structure and an antenna.

BACKGROUND

With the development of Internet of Things era and 5G mobile communication, wireless communication technology and wireless intelligent devices are constantly iteratively updated, which improves people's quality of life rapidly. Polarization is the direction of electric field oscillation on a plane orthogonal to the propagation direction of electromagnetic wave, and it is a key parameter of electromagnetic wave regulation. For multi-polarization sensitive applications and devices, such as communication, navigation and radar identification, it is necessary to control the polarization characteristics of electromagnetic waves.

SUMMARY

The following is a summary of subject matters described herein in detail. The summary is not intended to limit the protection scope of claims.

An embodiment of the present disclosure provides a polarization conversion structure including a ground structure layer, a first dielectric substrate and a radiation structure layer which are stacked in a direction perpendicular to a plane where the polarization conversion structure is located.

The radiation structure layer includes at least one radiation unit, the radiation unit includes a radiation structure, the radiation structure is symmetrical with respect to a first centerline, and the first centerline is a centerline of the radiation structure extending in a fourth direction on a plane parallel to the polarization conversion structure; and orthographic projections of the radiation unit and the ground structure layer on the first dielectric substrate are at least partially overlapped.

In an exemplary embodiment, the radiation unit further includes a resonant structure spaced apart from the radiation structure, the resonant structure is located around the radiation structure to form an annular structure, and the resonant structure includes a resonant opening.

In an exemplary embodiment, a shape of an outer contour of the resonant structure is a square, and the resonant openings are located at at least one set of opposite corners of the square, or the resonant openings are located at at least one set of opposite sides of the square; on a plane parallel to the polarization conversion structure, a set of opposite sides of the resonant structure extend in a first direction and another set of opposite sides of the resonant structure extend in a second direction, the resonant structure is symmetrical with respect to a third centerline and a fourth centerline, wherein the third centerline is a centerline of the resonant structure extending in the first direction and the fourth centerline is a centerline of the resonant structure extending in the second direction, wherein, the first direction, the second direction and the fourth direction intersect with each other.

In an exemplary embodiment, in a structure in which the resonant openings are located at at least one set of opposite corners or two sets of opposite sides of the square, the resonant structure is symmetrical with respect to a fifth centerline and a sixth centerline, on a plane parallel to the polarization conversion structure, the fifth centerline is a centerline of the resonant structure extending in the fourth direction, the sixth centerline is a centerline of the resonant structure extending in a third direction, the fifth centerline coincides with the first centerline, and the third direction intersects with the first direction, the second direction, and the fourth direction.

In an exemplary embodiment, the radiation structure is also symmetrical with respect to a second centerline, on a plane parallel to the polarization conversion structure, the second centerline is a centerline of the radiation structure extending in a third direction, wherein the third direction intersects with the first direction, the second direction, and the fourth direction.

In an exemplary embodiment, the radiation structure is a polygonal structure, and the first centerline coincides with a diagonal line of the polygonal structure extending in the fourth direction.

In an exemplary embodiment, the radiation structure is shaped as a hexagon, the hexagon includes a first set of opposite sides, a second set of opposite sides, and a third set of opposite sides, two sides of each set of opposite sides are parallel to each other, the first set of opposite sides extend in the first direction, the second set of opposite sides extend in the second direction, and the third set of opposite sides extend in the fourth direction.

In an exemplary embodiment, the annular structure has a line width of 0.1 mm to 0.4 mm; a size of the radiation structure along the first direction is equal to a size along the second direction, both of which are 5 mm to 7 mm; and ide lengths of two sides in the first set of opposite sides are equal to side lengths of two sides in the second set of opposite sides, both of which are 2 mm to 6 mm.

In an exemplary embodiment, the radiation structure has a double arrow shape, the double arrow shape includes two isosceles right triangles and a rectangle connecting the two isosceles right triangles as a whole, a set of opposite sides of the rectangle are respectively connected to bottom sides of the two isosceles right triangles, a centerline of the rectangle extending along the fourth direction and angular bisectors of two right angles of the two isosceles right triangles coincide with the first centerline.

In an exemplary embodiment, the radiation structure is shaped as a diamond, a diagonal line of the diamond coincides with the third centerline, and another diagonal line of the diamond coincides with the fourth centerline.

In an exemplary embodiment, the radiation structure is s formed by setting concave curved notches of a square radiation patch at a set of diagonal positions at two sides of the first centerline; or, the radiation structure is s formed by setting concave curved notches of a circular radiation patch at opposite positions of two sides of the first centerline; or, the radiation structure is formed by setting fan-shaped notches of a circular radiation patch at opposite positions of two sides of the first centerline.

In an exemplary embodiment, there are a plurality of radiation units, and the plurality of radiation units are arranged in an array.

In an exemplary embodiment, a plurality of radiation structures among the plurality of radiation units are arranged in a uniform manner.

In an exemplary embodiment, the polarization conversion structure is shaped as a square, on a plane parallel to the polarization conversion structure, a set of opposite sides of the polarization conversion structure extend along the first direction and another set of opposite sides of the polarization conversion structure extend along the second direction, and the plurality of radiation units are disposed symmetrically with respect to a seventh centerline and an eighth centerline, the seventh centerline is a centerline of the polarization conversion structure extending along a third direction and the eighth centerline is a centerline of the polarization conversion structure extending along the fourth direction.

In an exemplary embodiment, the polarization conversion structure is shaped as a square, the polarization conversion structure includes a first sub-array to a fourth sub-array defined by a ninth centerline and a tenth centerline, a plurality of radiation structures located in the first sub-array is arranged in a same manner with a plurality of radiation structures located in a third sub-array, a plurality of radiation structures located in a second sub-array is arranged in a same manner with a plurality of radiation structures located in the fourth sub-array, on a plane parallel to the polarization conversion structure, one set of opposite sides of the polarization conversion structure extend in the first direction and another set of opposite sides of the polarization conversion structure extend in the second direction, the ninth centerline is a centerline of the polarization conversion structure extending in the first direction, and the tenth centerline is a centerline of the polarization conversion structure extending in the second direction, wherein the first direction, the second direction, the third direction intersect with the fourth direction.

In an exemplary embodiment, the plurality of radiation units are disposed symmetrically with respect to the ninth centerline, the tenth centerline, a seventh centerline, and an eighth centerline, the seventh centerline is a centerline of the polarization conversion structure extending in the third direction and the eighth centerline is a centerline of the polarization conversion structure extending in the fourth direction on a plane parallel to the polarization conversion structure.

In an exemplary embodiment, a periodic length of the radiation unit in an arrangement direction is: $p=a+2*d+2*w$; wherein, p is a length of the radiation unit along the arrangement direction, w is a line width of the resonant structure, a is a length of the radiation structure along the arrangement direction, and d is a distance between opposite side surfaces of the resonant structure and a corresponding radiation structure.

In an exemplary embodiment, the length a of the radiation structure in the arrangement direction is 5 mm to 7 mm, the line width w of the resonant structure is 0.1 mm to 0.4 mm, the distance d between opposite side surfaces of two adjacent radiation units is 0.1 mm to 0.4 mm, the length of the radiation unit along the arrangement direction is 5.2 mm to 8.6 mm, and a distance between two adjacent radiation units is half an operating wavelength.

An embodiment of the disclosure further provides an antenna, including at least one polarization conversion structure described in any of the above-mentioned embodiments.

In an exemplary embodiment, the antenna further includes a feed, in a direction perpendicular to a plane of the polarization conversion structure, the polarization conversion structure includes a ground structure layer, a first dielectric substrate, and a radiation structure layer which are stacked, the feed is disposed at a side of the radiation structure layer away from the first dielectric substrate, the polarization conversion structure is configured to receive an electromagnetic wave from the feed and polarize the received electromagnetic wave.

In an exemplary embodiment, the antenna further includes a second dielectric substrate and a feed structure layer, in a direction perpendicular to a plane where the antenna is located, the polarization conversion structure includes a ground structure layer, a first dielectric substrate, a radiation structure layer which are stacked; the second dielectric substrate and the feed structure layer are located between the ground structure layer and the first dielectric substrate, and the feed structure layer is located at a side of the second dielectric substrate away from the ground structure layer.

In an exemplary embodiment, the antenna further includes at least one coaxial conductive structure, the radiation structure layer includes at least one radiation unit, the feed structure layer includes at least one feed structure, and the at least one feed structure is electrically connected to the ground structure layer through the at least one coaxial conductive structure. The at least one feed structure corresponds to the at least one radiation structure, and an orthographic projection of the feed structure on the first dielectric substrate is at least partially overlapped with an orthographic projection of a corresponding radiation structure on the first dielectric substrate.

Other aspects may be understood upon reading and understanding the drawings and detailed description.

BRIEF DESCRIPTION OF DRAWINGS

Accompanying drawings are intended to provide further understanding of technical solutions of the present disclosure and form a part of the specification, and are used to explain the technical solutions of the present disclosure together with embodiments of the present disclosure, but do not form limitations on the technical solutions of the present disclosure. Shapes and sizes of each component in the drawings do not reflect actual scales, but are only intended to schematically illustrate contents of the present disclosure.

DETAILED DESCRIPTION

Figure 1:
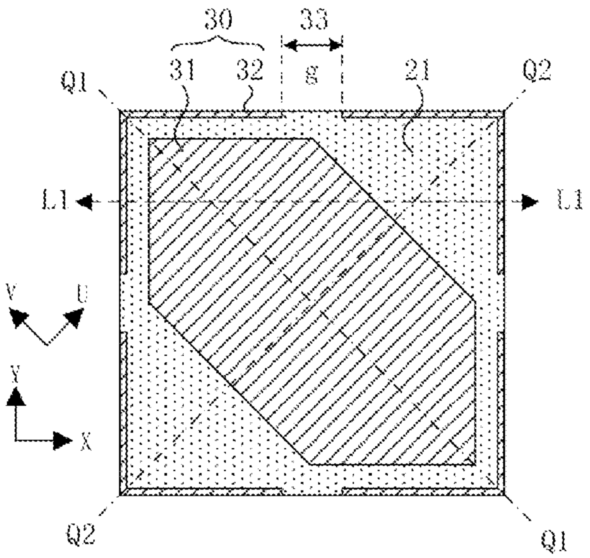
FIG. 1 is a schematic diagram of a planar structure of a polarization conversion structure according to an embodiment of the present disclosure.

Embodiments of the present disclosure will be described in detail hereinafter with reference to the drawings. Implementation modes may be implemented in multiple different forms. Those of ordinary skills in the art can easily understand such a fact that implementation modes and contents may be transformed into various forms without departing from the purpose and scope of the present disclosure. Therefore, the present disclosure should not be explained as is limited to the contents recorded in the following implementations only. The embodiments and features in the embodiments of the present disclosure may be randomly combined with each other if there is no conflict. In order to keep following description of the embodiments of the present disclosure clear and concise, detailed description of part of known functions and known components are omitted in the present disclosure. The drawings in the embodiments of the present disclosure relate only to the structures involved in the embodiments of the present disclosure, and other structures may be described with reference to conventional designs.

Scales of the drawings in the present disclosure may be used as a reference in actual processes, but are not limited thereto. For example, a thickness and a pitch of each film layer, and a width and a pitch of each signal line may be adjusted according to an actual situation. The drawings described in the present disclosure are only schematic diagrams of structures, and one implementation of the present disclosure is not limited to shapes or numerical values or the like shown in the drawings.

Ordinal numerals “first”, “second”, “third”, etc., in the specification are set not to form limits on numbers but only to avoid confusion between composition elements.

In the specification, for convenience, expressions “central”, “above”, “below”, “front”, “back”, “vertical”, “horizontal”, “top”, “bottom”, “inside”, “outside”, etc., indicating directional or positional relationships are used to illustrate positional relationships between the composition elements, not to indicate or imply that involved devices or elements are needed to have specific orientations and be structured and operated with the specific orientations but only to easily and simply describe the present specification, and thus should not be understood as limitations on the present disclosure. The positional relationships between the constituent elements may be changed as appropriate according to a direction which is used for describing each constituent element. Therefore, appropriate replacements based on situations are allowed, which is not limited to the expressions in the specification.

In the specification, unless otherwise specified and defined, terms “mounting”, “mutual connection”, and “connection” should be understood in a broad sense. For example, a connection may be a fixed connection, or a detachable connection, or an integral connection; it may be a mechanical connection or an electrical connection; it may be a direct connection, or an indirect connection through an intermediate, or an internal communication between two elements. Those of ordinary skills in the art can understand specific meanings of the above terms in the present disclosure according to specific situations.

In the specification, “electrical connection” includes connection of composition elements through an element with a certain electrical action. An "element with a certain electrical action" is not particularly limited as long as electric signals between the connected composition elements may be sent and received. Examples of the "element with a certain electric action" not only include an electrode and a wiring, but also may include a switch element such as a transistor or the like, a resistor, an inductor, a capacitor, another element with one or more functions, or the like.

In the specification, "parallel" refers to a state in which an angle formed by two straight lines is above −10° and below 10°, and thus may include a state in which the angle is above −5° and below 5°. In addition, "perpendicular" refers to a state in which an angle formed by two straight lines is above 80° and below 100°, and thus may include a state in which the angle is above 85° and below 95°.

In the specification, a "film" and a "layer" are interchangeable. For example, a "conductive layer" may be replaced with a "conductive thin film" sometimes. Similarly, an "insulation thin film" may be replaced with an "insulation layer" sometimes.

Triangle, rectangle, trapezoid, pentagon, hexagon, etc. in this specification are not strictly defined, and they may be approximate triangle, rectangle, trapezoid, pentagon, hexagon, etc. There may be some small deformations caused by tolerance, and there may be chamfer, arc edge, deformation, etc.

In the present disclosure, "about" refers to that a boundary is not defined so strictly and numerical values within a range of process and measurement errors are allowed.

In the present disclosure, a "thickness" is a dimension of a film layer in a direction perpendicular to a substrate.

The traditional polarization converter has some disadvantages such as narrow bandwidth, large volume and difficult machining, which cannot meet the needs of practical use.

An embodiment of the disclosure provides a polarization conversion structure, which may include a ground structure layer, a first dielectric substrate and a radiation structure layer which are stacked in a direction perpendicular to the plane where the polarization conversion structure is located.

The radiation structure layer may include at least one radiation unit, the radiation unit includes a radiation structure, the radiation structure is symmetrical with respect to a first centerline, and the first centerline is a centerline of the radiation structure extending in a fourth direction on a plane parallel to the polarization conversion structure; and orthographic projections of the radiation unit and the ground structure layer on the first dielectric substrate are at least partially overlapped.

In the polarization conversion structure according to an embodiment of the present disclosure, the radiation unit and the ground structure layer are respectively arranged at two sides of the first dielectric layer, the radiation structure in the radiation unit is symmetrically arranged relative to the first centerline, and has characteristics of simple structure, easy to process, low profile and small volume on the premise of higher conversion ratio.

In practical application, it is of great engineering significance to design a polarization conversion structure with simple structure, compact size and good performance.

In an exemplary embodiment, the polarization conversion structure according to an embodiment of the present disclosure is a polarization conversion surface (PCM) structure based on a super surface, which has characteristics of low profile, flexible design, small loss, easy to process and the like, and has obvious advantages in engineering application, which can improve the gain of an antenna, reduce crosstalk and reduce the radar cross section (RCS).

Figure 2:
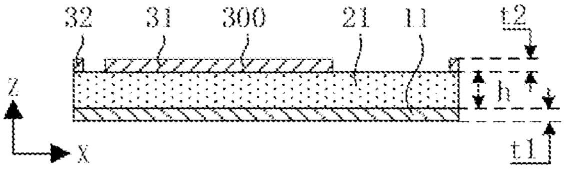
FIG. 2 is a schematic diagram of a cross-sectional structure of the L1-L1 position in FIG. 1*a*.

As shown in FIGS. 1 and 2, a planar structure diagram of a polarization conversion structure according to an embodiment of the present disclosure is shown. FIG. 2 is a sectional view of the L1-L1 position in FIG. 1. In a direction Z perpendicular to the plane where the polarization conversion structure is located, the polarization conversion structure may include a ground structure layer 11, a first dielectric substrate 21, and a radiation structure layer 300 which are stacked.

The radiation structure layer 300 may include at least one radiation unit 30, the radiation unit 30 may include a radiation structure 31, which may be symmetrical with respect to a first centerline Q1-Q1, which is a centerline of the radiation structure 31 extending in a fourth direction V on a plane parallel to the polarization conversion structure; the orthographic projections of the radiation unit 30 and the ground structure layer 11 on the first dielectric substrate 21 are at least partially overlapped.

In an exemplary embodiment, as shown in FIG. 2, the thickness h of the first dielectric substrate 21 is 1 mm to 2 mm, the thickness t1 of the ground structure layer 11 is 0.01 mm to 0.05 mm, and the thickness t2 of the radiation structure layer 300 is 0.01 mm to 0.05 mm. It can be understood that in the direction Z perpendicular to the plane where the polarization conversion structure is located, the dimension h of the first dielectric substrate 21 is 1 mm to 2 mm, the dimension t1 of the ground structure layer 11 is 0.01 mm to 0.05 mm, and the dimension t2 of the radiation structure layer 300 is 0.01 mm to 0.05 mm. For example, the thickness h of the first dielectric substrate 21 is 1.6 mm, the thickness t1 of the ground structure layer 11 is 0.035 mm, and the thickness t2 of the radiation structure layer is 0.035 mm.

In an exemplary embodiment, as shown in FIG. 1, the radiation unit 30 may further include a resonant structure 32 spaced apart from the radiation structure 31, the resonant structure 32 is located around the radiation structure 31 to form an annular structure, the resonant structure 32 may include a resonant opening 33, and the annular structure is disconnected at the position of the resonant opening 33.

Figure 3A:
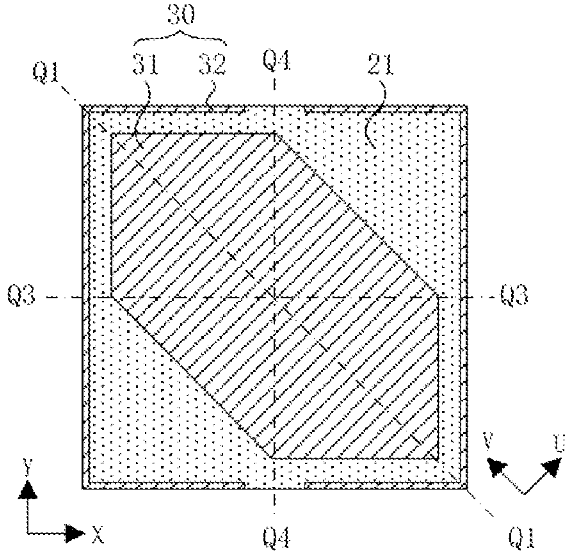
FIG. 3*a* is a schematic diagram of a planar structure of a polarization conversion structure according to an exemplary embodiment of the present disclosure.
Figure 3B:
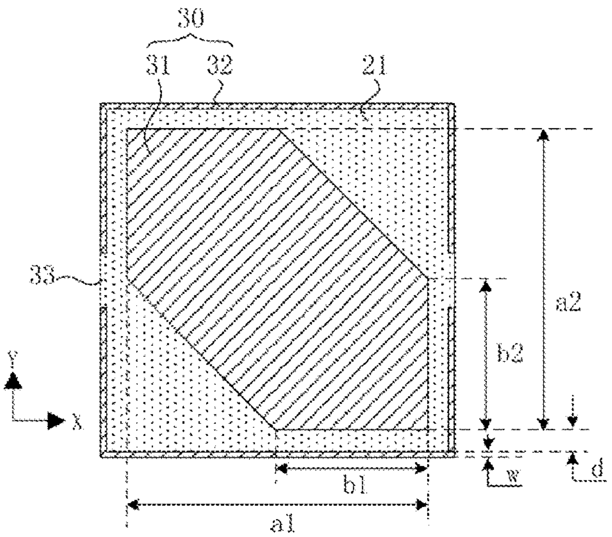
FIG. 3*b* is a schematic diagram of a planar structure of a polarization conversion structure according to an exemplary embodiment of the present disclosure.
Figure 3C:
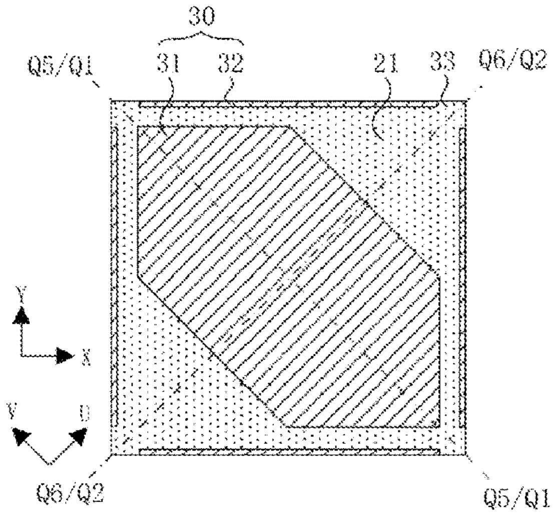
FIG. 3*c* is a schematic diagram of a planar structure of a polarization conversion structure according to an exemplary embodiment of the present disclosure.
Figure 3D:
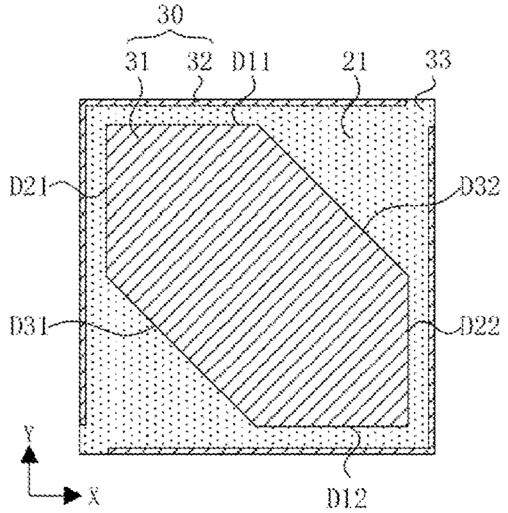
FIG. 3*d* is a schematic diagram of a planar structure of a polarization conversion structure according to an exemplary embodiment of the present disclosure.
Figure 3E:
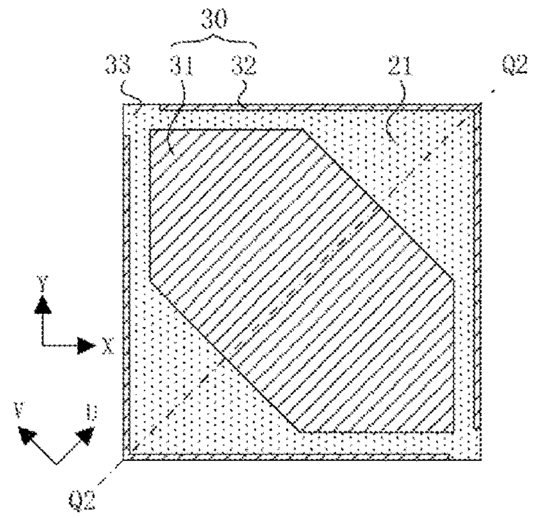
FIG. 3*e* is a schematic diagram of a planar structure of a polarization conversion structure according to an exemplary embodiment of the present disclosure.

In an exemplary embodiment, the shape of the outer contour of the resonant structure 32 may be a square, as shown in FIGS. 1, 3*a* and 3*b*, and the resonant openings 33 may be located at at least one set of opposite sides of the square, or, as shown in FIGS. 3*c* to 3*e*, the resonant openings 33 may be located at at least one set of opposite corners of the square. In the structures shown in FIGS. 1, 3*a* to 3*e*, on a plane parallel to the polarization conversion structure, one set of opposite sides of the resonant structure 31 extend along a first direction X and the other set of opposite sides extend along a second direction Y, and the resonant structure 32 is symmetrical with respect to a third centerline Q3-Q3 that is the centerline of the resonant structure 32 extending along the first direction X and a fourth centerline Q4-Q4 that is the centerline of the resonant structure 32 extending along the second direction Y, where the first direction X, the second direction Y and the fourth direction V intersect with each other.

In an exemplary embodiment, as shown in FIGS. 1, 3*c* to 3*e*, in a structure in which the resonant openings 33 are located at at least one set of opposite corners or two sets of opposite sides of a square (the shape of the outer contour of the resonant structure 32), the resonant structure 32 may also be symmetrical with respect to a fifth centerline Q5-Q5 that is the centerline of the resonant structure 32 extending in a fourth direction V and a sixth centerline Q6-Q6 that is the centerline of the resonant structure 32 extending in a third direction U, where the third direction U intersects with the first direction X, the second direction Y, and the fourth direction V. In an exemplary embodiment, the fifth centerline Q5-Q5 coincides with the first centerline Q1-Q1.

In an exemplary embodiment, as shown in FIGS. 1, 3*a* through 3*e*, the radiation structure 31 may also be symmetrical with respect to a second centerline Q2-Q2, which may be a centerline of the radiation structure 31 extending in a third direction U on a plane parallel to the polarization conversion structure, wherein, the third direction U intersects with the first direction X, the second direction Y, and the fourth direction V.

In an exemplary embodiment, the second centerline Q2-Q2 may coincide with the sixth centerline Q6-Q6. In an exemplary embodiment, the first centerline Q1-Q1, the fifth centerline Q5-Q5 may coincide with a diagonal line of the square (the shape of the outer contour of the resonant structure 32) extending in the fourth direction V, and the second centerline Q2-Q2, the sixth centerline Q6-Q6 may coincide with a diagonal line of the square (the shape of the outer contour of the resonant structure 32) extending in the third direction U.

In an exemplary embodiment, as shown in FIGS. 1, 3*a* to 4, the radiation structure 31 may be a polygonal structure, and the first centerline Q1-Q1 coincides with a diagonal line of the polygonal structure extending in the fourth direction.

In an exemplary embodiment, as shown in FIGS. 1, 3*a* through 3*e*, the shape of the radiation structure 31 may be a hexagon including a first set of opposite sides (D11 and D12), a second set of opposite sides (D21 and D22), and a third set of opposite sides (D31 and D32), two sides of each set of opposite sides are parallel to each other, the first set of opposite sides extend in a first direction X, the second set of opposite sides extend in a second direction Y, and the third set of opposite sides extend in a fourth direction V. In an exemplary embodiment, the radiation structure 31 may be formed by cutting a set of opposite corners of a square radiation patch. In an exemplary embodiment, the first set of opposite sides (D11 and D12) are parallel to one set of opposite sides of the resonant structure 32, the second set of opposite sides (D21 and D22) are parallel to the other set of opposite sides of the resonant structure 32, and the third set of opposite sides (D31 and D32) are parallel to the first centerline Q1-Q1.

In an exemplary embodiment, the line width w of the resonant structure 32 of the annular structure may be 0.1 mm to 0.4 mm. As shown in FIGS. 1, 3*a* to 3*e*, the radiation structure 31 has a dimension a1 in the first direction X equal to a dimension a2 in the second direction, both of which are 5 mm to 7 mm, and the side lengths b1 of two sides in the first set of opposite sides (D11 and D12) are equal to the side lengths b2 of two sides in the second set of opposite sides (D21 and D22), both of which are 2 mm to 6 mm. For example, a1=a2=6 mm, and b1 and b2 can have dimensions of 3 mm, 3.5 mm, 4 mm, 4.5 mm, 5 mm, and 5.5 mm. In an exemplary embodiment, as shown in FIGS. 1 and 3*a*, the size g of the resonant opening 33 is about half an operating wavelength, which may be the wavelength of the electromagnetic wave received by the polarization conversion structure.

Figure 4:
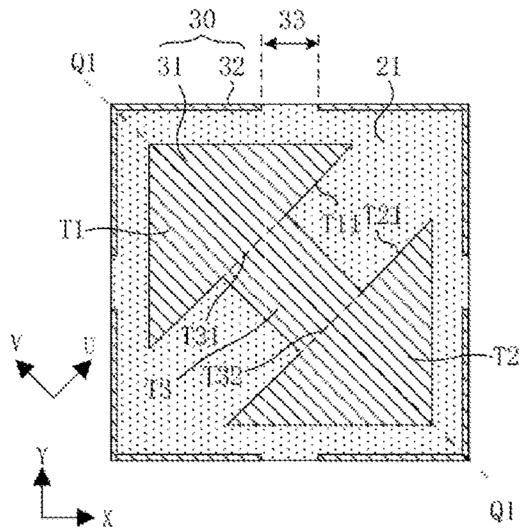
FIG. 4 is a schematic diagram of a planar structure of a polarization conversion structure according to an exemplary embodiment of the present disclosure.

In an exemplary embodiment, as shown in FIG. 4, the shape of the radiation structure 31 may be a double arrow shape, which may include two isosceles right triangles (T1 and T2) and a rectangle (T3), the rectangle T3 connects the two isosceles right triangles (T1 and T2) as a whole, a set of opposite sides (T31 and T32) of the rectangle T3 are connected to the bottom sides (T11 and T21) of the two isosceles right triangles, respectively, a centerline of the rectangle T3 extending along the fourth direction V, and angular bisectors of the two right angles in the two isosceles right triangles (T1 and T2) coincide with the first centerline Q1-Q1.

Figure 5:
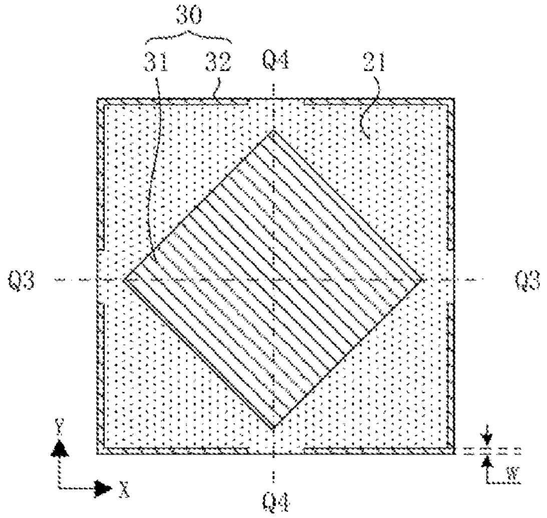
FIG. 5 is a schematic diagram of a planar structure of a polarization conversion structure according to an exemplary embodiment of the present disclosure.

In an exemplary embodiment, as shown in FIG. 5, the radiation structure 31 may be shaped as a diamond, one diagonal line of the diamond coincides with the third middle line Q3-Q3, and the other diagonal line of the diamond coincides with the fourth middle line Q4-Q4.

Figure 6:
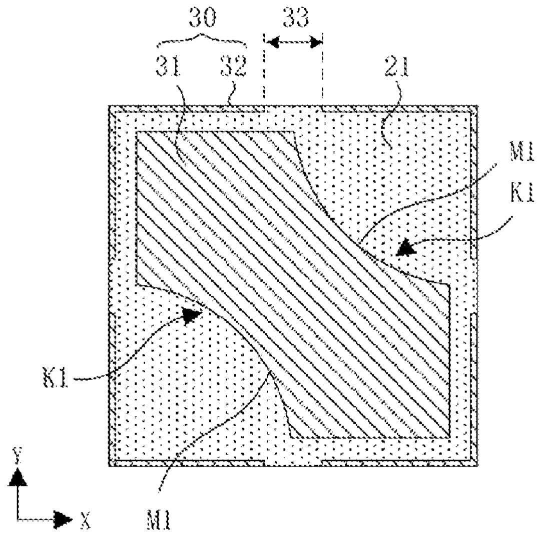
FIG. 6 is a schematic diagram of a planar structure of a polarization conversion structure according to an exemplary embodiment of the present disclosure.
Figure 7:
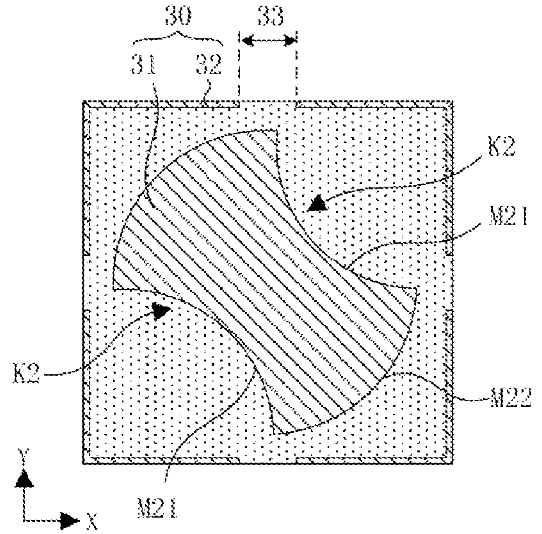
FIG. 7 is a schematic diagram of a planar structure of a polarization conversion structure according to an exemplary embodiment of the present disclosure.
Figure 8:
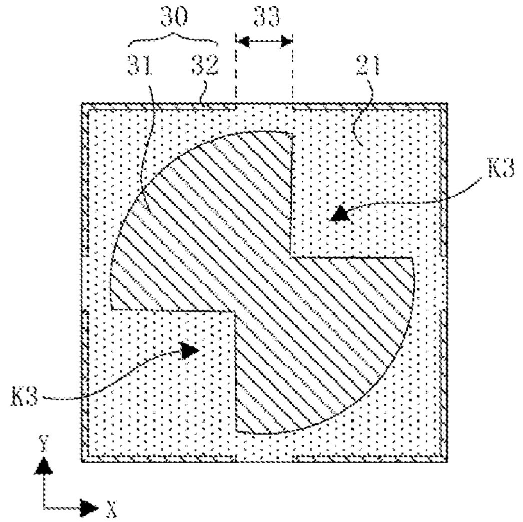
FIG. 8 is a schematic diagram of a planar structure of a polarization conversion structure according to an exemplary embodiment of the present disclosure.

In an exemplary embodiment, as shown in FIG. 6, the radiation structure 31 may be formed by setting concave curved notches K1 of a square radiation patch at a set of diagonal positions on two sides of the first centerline Q1-Q1; for example, the radiation structure 31 may be formed by cutting rounded corners of the square radiation patch at a set of diagonal line positions. Or, as shown in FIG. 7, the radiation structure 31 is formed by cutting concave curved notches K2 of a circular radiation patch at the opposite positions of two sides of the first centerline Q1-Q1; for example, the radiation structure 31 may be formed by cutting arcs of a circular radiation patch at the opposite position of two sides of the first centerline Q1-Q1. Or, as shown in FIG. 8, the radiation structure 31 is formed by setting fan-shaped notches K3 of a circular radiation patch at the opposite positions of two sides of the first centerline Q1-Q1, and the radiation structure 31 may be formed by cutting fan shapes of a circular radiation patch at the opposite positions of two sides of the first centerline Q1-Q1.

Figure 9:
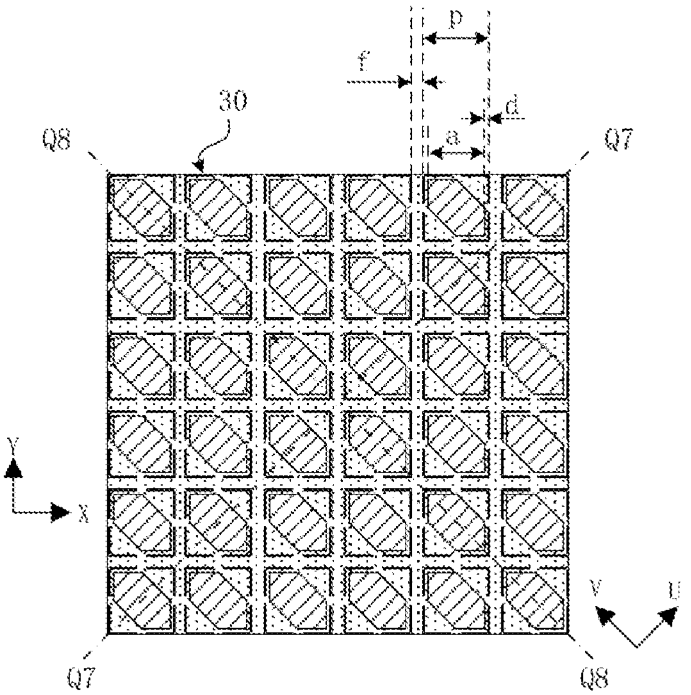
FIG. 9 is a schematic diagram of a planar structure of a polarization conversion structure according to an exemplary embodiment of the present disclosure.
Figure 10:
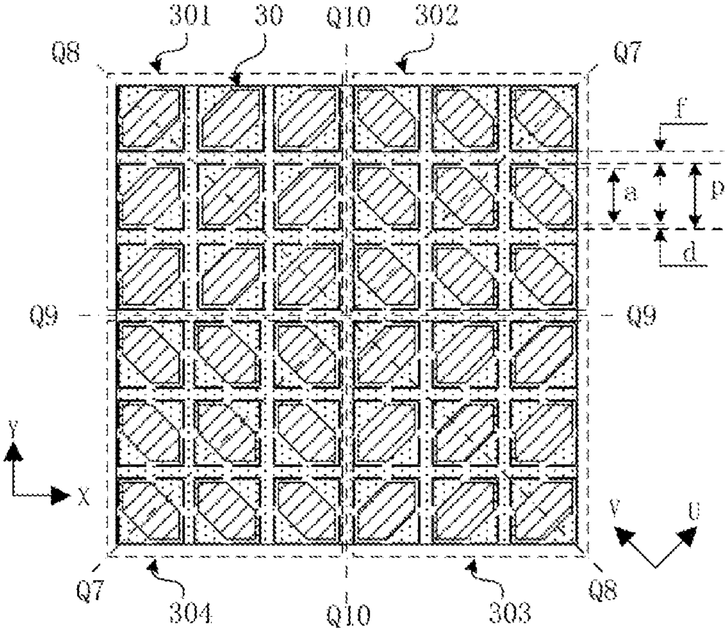
FIG. 10 is a schematic diagram of a planar structure of a polarization conversion structure according to an exemplary embodiment of the present disclosure.

In an exemplary embodiment, as shown in FIGS. 9 and 10, there are a plurality of radiation units 30, and the plurality of radiation units 30 are arranged in an array. In an exemplary embodiment, the array arrangement of a plurality of radiation units 30 may satisfy the requirement of high bandwidth and high gain.

In the exemplary embodiment, as shown in FIG. 9, the plurality of radiation structures 31 in the plurality of radiation units 30 are arranged in the same manner.

In an exemplary embodiment, as shown in FIG. 9, the polarization conversion structure may be square, one set of opposite sides of the polarization conversion structure extend along the first direction X and the other set of opposite sides of the polarization conversion structure extend along the second direction Y on a plane parallel to the polarization conversion structure, and a plurality of radiation units 30 may be disposed symmetrically with respect to a seventh centerline Q7-Q7 that is a centerline of the polarization conversion structure extending along the third direction U and an eighth centerline Q8-Q8 that is a centerline of the polarization conversion structure extending along the fourth direction V.

In an exemplary embodiment, as shown in FIG. 10, the polarization conversion structure is square, the polarization conversion structure includes a first sub-array 301 to a fourth sub-array 304 defined by a ninth centerline Q9-Q9 and a tenth centerline Q10-Q10, the plurality of radiation structures 31 located in the first sub-array 301 are arranged in a manner consistent with the arrangement of the plurality of radiation structures 31 located in the third sub-array 303, and the plurality of radiation structures 31 located in the second sub-array 302 are arranged in a manner consistent with the arrangement of the plurality of radiation structures 31 located in the fourth sub-array 304. On a plane parallel to the polarization conversion structure, one set of opposite sides of the polarization conversion structure extend along the first direction X and the other set of opposite sides extend along the second direction Y, the ninth centerline Q9-Q9 is the centerline of the polarization conversion structure extending along the first direction X, and the tenth centerline Q10-Q10 is the centerline of the polarization conversion structure extending along the second direction Y, and the ninth centerline Q9-Q9 intersects with the tenth centerline Q10-Q10.

In an exemplary embodiment, as shown in FIG. 10, a plurality of radiation units 30 may be disposed symmetrically with respect to a ninth centerline Q9-Q9, a tenth centerline Q10-Q10, a seventh centerline Q7-Q7 and an eighth centerline Q8-Q8, on a plane parallel to the polarization conversion structure, the seventh centerline Q7-Q7 is a centerline of the polarization conversion structure extending in the third direction U, and the eighth centerline Q8-Q8 is a centerline of the polarization conversion structure extending in the fourth direction V.

In an exemplary embodiment, in the structures shown in FIGS. 9 and 10, a straight line on which the center connection line of one set of opposite sides of the polarization conversion structure is located overlaps with an orthographic projection of the ninth centerline Q9-Q9 on the first dielectric substrate 21, and a straight line on which the center connection line of the other set of opposite sides of the polarization conversion structure is located overlaps with an orthographic projection of the tenth centerline Q10-Q10 on the first dielectric substrate 21. Two diagonal lines of the polarization conversion structure overlap with the orthographic projections of the seventh centerline Q7-Q7 and the eighth centerline Q8-Q8 on the first dielectric substrate 21, respectively.

In an exemplary embodiment, as shown in FIGS. 9 and 10, the length of the radiation unit 30 in the arrangement direction is: p=a+2*d+2*w.

Herein, p is the length of the radiation unit 30 in the arrangement direction, d is the distance between the opposite side surfaces of two adjacent radiation units 30, w is the line width of the resonant structure 32, and a is the length of the radiation structure 31 in the arrangement direction. The designation of the line width w of the resonant structure 32 can be shown with reference to FIGS. 3*b* and 4.

In an exemplary embodiment, as shown in FIGS. 9 and 10, the arrangement directions of the radiation units 30 may be a first direction X and a second direction Y.

In an exemplary embodiment, the length a of the radiation structure 31 in the arrangement direction may be 5 mm to 7 mm, the line width w of the resonant structure 32 may be 0.1 mm to 0.4 mm, the distance d between the opposite side surfaces of the resonant structure 32 and the corresponding radiation structure 31 may be 0.1 mm to 0.4 mm, and the length p of the radiation unit 30 in the arrangement direction may be 5.2 mm to 8.6 mm. For example, the length a of the radiation structure 31 in the arrangement direction may be 6 mm, and the length p of the radiation unit 30 in the arrangement direction may be 7 mm.

In an exemplary embodiment, the distance f between two adjacent radiation units 30 (i.e. the distance between opposite side surfaces of two adjacent radiation units 30) may be about half an operating wavelength. In an exemplary embodiment, the operating wavelength may be the wavelength of the electromagnetic wave received by the polarization conversion structure.

In an exemplary embodiment, in the process of designing the polarization conversion structure, the periodic length p of the radiation unit 30 in the arrangement direction may be determined first, then the length a of the radiation structure 31 in the arrangement direction may be determined, and then the line width w of the resonant structure 32 may be optimized according to the simulation result, thereby determining the value of the line width w of the resonant structure 32, and finally the value of the distance d between the opposite side surfaces of the final resonant structure 32 and the corresponding radiation structure 31 may be obtained according to the formula p=a+2*d+2*w.

In an exemplary embodiment, in the polarization conversion structure shown in FIGS. 1, 3*a* to 9, the polarization angle of the linearly polarized electromagnetic wave may be converted, or the polarization angle of the circularly polarized electromagnetic wave may be converted. In the polarization conversion structure shown in FIG. 10, the combination and decomposition between linear polarization and circular polarization can be achieved, that is, the linearly polarized electromagnetic wave can be converted into the circularly polarized electromagnetic wave, or the circularly polarized electromagnetic wave can be converted into the linearly polarized electromagnetic wave.

In the exemplary embodiment, according to the polarization conversion structure as shown in FIGS. 1, 3*a* to 8, on the premise of achieving the polarization conversion function, the radiation unit 30 has the characteristics of simple design structure, low profile, flexible design, small loss, easy to process, etc., and has obvious advantages in engineering application, which can improve the gain of the antenna, reduce crosstalk, and reduce the radar cross section (RCS).

In an exemplary embodiment, the radiation units 30 shown in FIGS. 1, 3*a* to 8 may be used as polarization conversion structures separately, or a plurality of radiation units 30 may be formed into an array to obtain a polarization conversion structures shown in FIG. 9 or 10.

In an exemplary embodiment, according to the radiation unit 30 (which may be separately used as a polarization conversion structure) as shown in FIG. 1, FIG. 3*a* to FIG. 3*e*, and FIG. 5, the radiation structure 31 is designed in a simple manner, which greatly reduces the difficulty of the processing process.

In the exemplary embodiment, as shown in FIG. 4, in the radiation unit 30 (which can be separately used as a polarization conversion structure), the radiation structure 31 is set in a double arrow shape, so that polarization conversion of multiple frequency bands can be achieved, and bandwidth characteristics and conversion ratio of different frequency bands can be improved by optimizing parameters, thereby achieving a polarization conversion function of two or more working frequency bands by one radiation unit.

In an exemplary embodiment, according to the radiation unit 30 (which can be separately used as a polarization conversion structure) shown in FIG. 6, the radiation structure 31 can be formed by cutting rounded corners of a square radiation patch at a set of opposite corner positions, and a concave arc M1 is formed at the edge of the cut rounded corner position in the radiation structure 31. The bandwidth is affected by the edge shape of the arc M1 in the radiation structure 31. The bandwidth of the polarization conversion structure can be flexibly set by changing the arc length of the arc M1 at the cut rounded corner position and the radius of the circle where the arc M1 is located. After optimization, a polarization conversion structure with narrow bandwidth and high directivity can be obtained, and the processing difficulty is small.

In an exemplary embodiment, according to the radiation unit 30 (which can be used as a polarization conversion structure alone) shown in FIG. 7, the radiation structure 31 is formed by cutting off circular arcs of a circular radiation patch at opposite positions on two sides of the first centerline Q1-Q1, and the radiation structure 31 has a concave first arc edge M21 and a convex second arc edge M22. Because the arc change between the concave first arc edge M21 and the convex second arc edge M22 is obvious, the current flowing through the edge of the radiation structure 31 changes rapidly, resulting in a relative narrow frequency bandwidth ratio around the center frequency point, and the polarization conversion function with ultra-narrow bandwidth and strong directivity can be achieved.

In an exemplary embodiment, according to the radiation unit 30 (which may be separately used as a polarization conversion structure) as shown in FIG. 8, the radiation structure 31 is formed by cutting fan shapes of a circular radiation patch at opposite positions on two sides of the first centerline Q1-Q1, so that the current flowing through the edge of the radiation structure 31 changes slowly, which is beneficial for improving the gain and directivity on the basis of proper bandwidth expansion.

The simulation results of the polarization conversion structure (including a radiation unit 30) shown in FIG. 1 will be described below. When the other dimensions of the polarization conversion structure remain unchanged and the size of the side length b of the short side of the radiation structure 31 (i.e. the side length of the radiation structure 31 extending in the second direction Y) changes, the simulation results of the polarization conversion structure are as follows.

The thickness h of the first dielectric substrate 21 is 1.6 mm, the thickness t1 of the ground structure layer 11 is 0.035 mm, the thickness t2 of the radiation structure 31 is 0.035 mm, the side length p of the square radiation unit 30 is 7 mm, and the lengths a of the first direction X and the second direction Y of the radiation structure 31 are 6.4 mm.

In an exemplary embodiment, in consideration of the dielectric constant of the first dielectric substrate 21 during the simulation, an effective wavelength may be used, the effective wavelength=an operating wavelength/a dielectric constant, the operating wavelength may be a wavelength of the received electromagnetic wave.

Figure 11A:
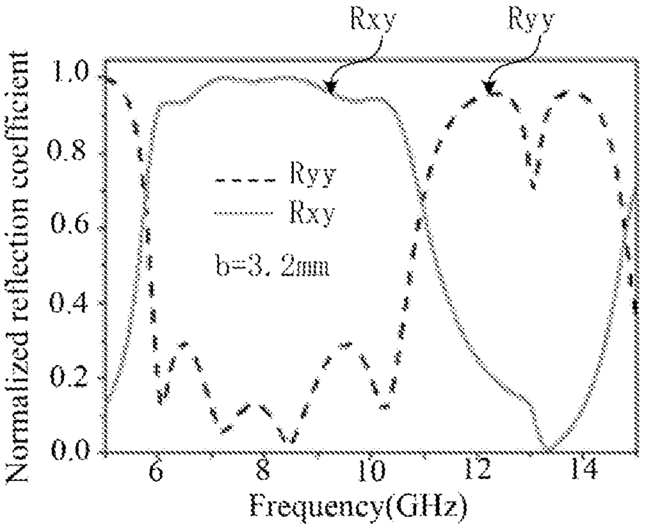
FIG. 11*a* is a reflection coefficient simulation graph of a polarization conversion structure according to an exemplary embodiment of the present disclosure.
Figure 11B:
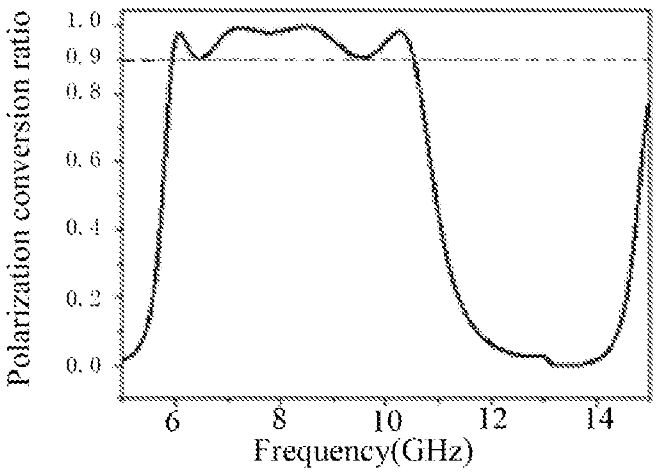
FIG. 11*b* is a polarization conversion ratio simulation graph of a polarization conversion structure according to an exemplary embodiment of the present disclosure.
Figure 11C:
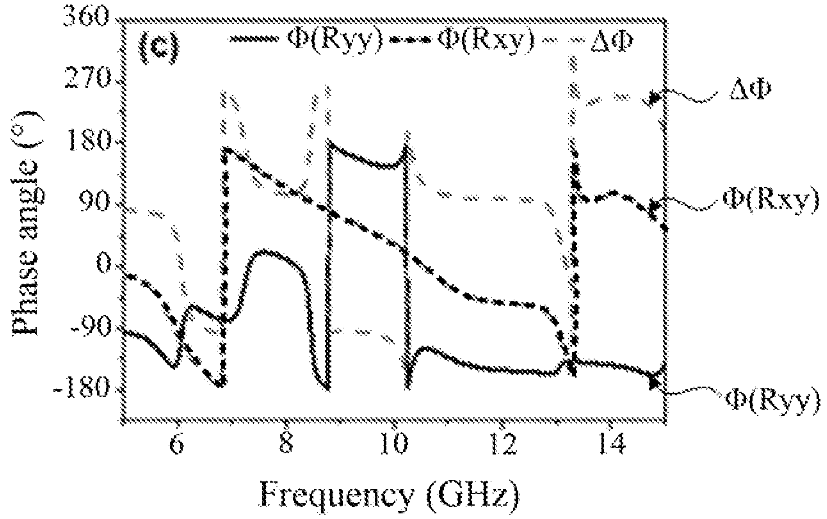
FIG. 11*c* is a phase angle simulation graph of a polarization conversion structure according to an exemplary embodiment of the present disclosure.

FIGS. 11*a* to 11*c* are schematic diagrams of simulation results with the side length b (the side length of the radiation structure 31 extending in the second direction Y) of the short side of the radiation structure 31 in FIG. 1 being 3.2 mm, wherein FIG. 11*a* is a schematic diagram of a simulation result of the normalized reflection coefficient, FIG. 11*b* is a schematic diagram of a simulation result of the polarization conversion ratio, and FIG. 11*c* is a schematic diagram of a simulation result of the phase angle. As can be seen from FIG. 11*a*, in the frequency band of 6-10 GHz, the amplitude of the reflection coefficient ($R_{xy}$) of cross polarization exceeds 0.95, and the reflection coefficient ($R_{yy}$) of main polarization is lower than 0.3. As can be seen from FIG. 11*b*, the polarization conversion ratio (PCR) is higher than 0.9 in the 6-10 GHz band. As shown in FIG. 11*c*, through the simulation of phase difference ($\Delta\Phi$), it can be seen that the phase difference in the whole frequency band is −154-294°, but it does not affect the polarization conversion ratio (because $R_{xy}$ is much greater than $R_{yy}$). In FIG. 11*c*, at one of the determined frequencies, $\Delta\Phi=\Phi(R_{xy})-\Phi R_{yy})$, where $\Delta\Phi$ is the phase difference and $\Phi(R_{yy})$ is the phase angle of the main polarization reflection coefficient when the polarization direction of the incident wave is the second direction Y; $\Phi(R_{xy})$ is the phase angle of the cross polarization reflection coefficient when the polarization direction of the incident wave is the second direction Y.

Figure 12:
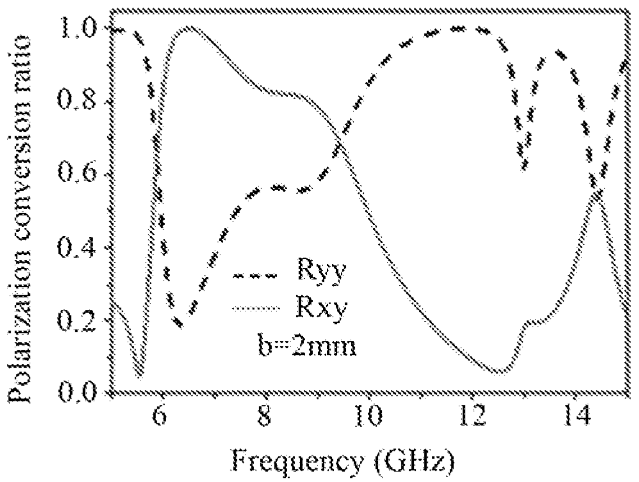
FIG. 12 is a polarization conversion ratio simulation graph of a polarization conversion structure according to an exemplary embodiment of the present disclosure.
Figure 13:
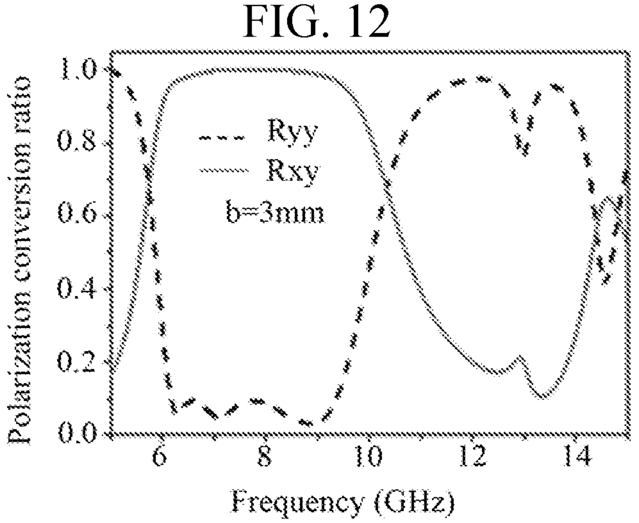
FIG. 13 is a polarization conversion ratio simulation graph of a polarization conversion structure according to an exemplary embodiment of the present disclosure.
Figure 14:
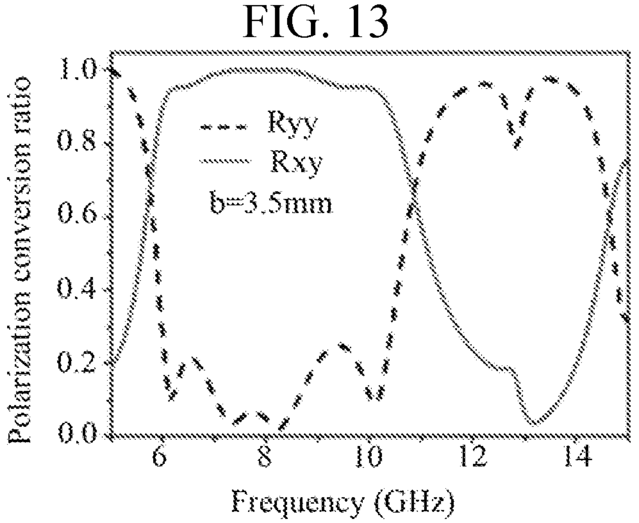
FIG. 14 is a polarization conversion ratio simulation graph of a polarization conversion structure according to an exemplary embodiment of the present disclosure.

FIG. 12 is a schematic diagram of a simulation result of the polarization conversion ratio when the side length b (the side length of the radiation structure 31 extending in the second direction Y) of the short side of the radiation structure 31 in FIG. 1 is 2 mm. FIG. 13 is a schematic diagram of a simulation result of the polarization conversion ratio when the side length b (the side length of the radiation structure 31 extending in the second direction Y) of the short side of the radiation structure 31 in FIG. 1 is 3 mm. FIG. 14 is a schematic diagram of a simulation result of the polarization conversion ratio when the side length b (the side length of the radiation structure 31 extending in the second direction Y) of the short side of the radiation structure 31 in FIG. 1 is 3.5 mm. From FIGS. 12 to 13, it can be compared and seen that in the structure with the short side length b of radiation structure 31 of 3 mm, it can be found that there are larger $R_{xy}$ reflection coefficient amplitudes (over 0.98 in 6.5-9.1 GHz band and 1 in 7-9 GHz band) and the lowest $R_{yy}$ reflection coefficient amplitudes (below 0.1 in 6.5-9.1 GHz band), which shows that better polarization conversion ratio can be obtained when b value is 3 mm. As shown in FIG. 14, in a structure in which the side length b (the side length of the radiation structure 31 extending in the second direction Y) of the short side of the radiation structure 31 is 3.5 mm, a wider operating bandwidth (the reflection coefficient $R_{xy}$ is higher than 0.95 in the frequency band of 6-10.2 GHZ) can be achieved while the reflection coefficient and the conversion ratio are not greatly reduced.

Figure 15:
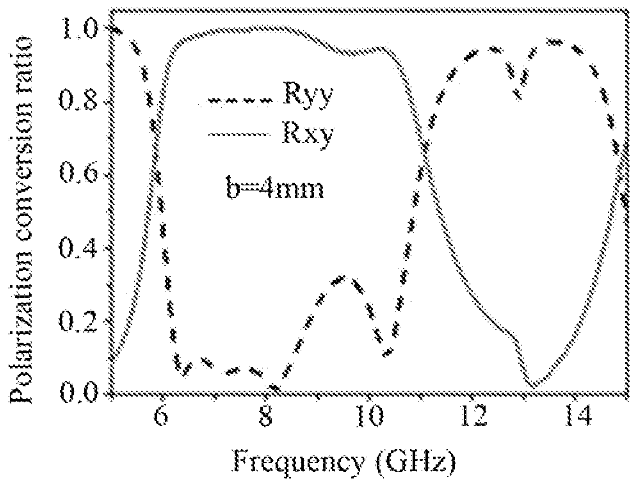
FIG. 15 is a polarization conversion ratio simulation graph of a polarization conversion structure according to an exemplary embodiment of the present disclosure.
Figure 16:
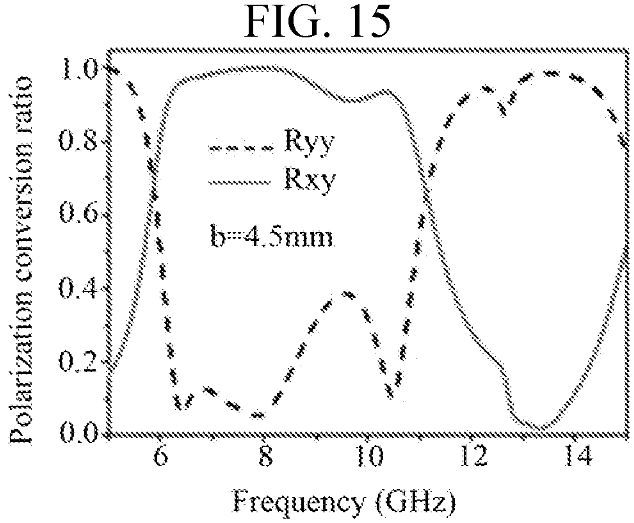
FIG. 16 is a polarization conversion ratio simulation graph of a polarization conversion structure according to an exemplary embodiment of the present disclosure.
Figure 17:
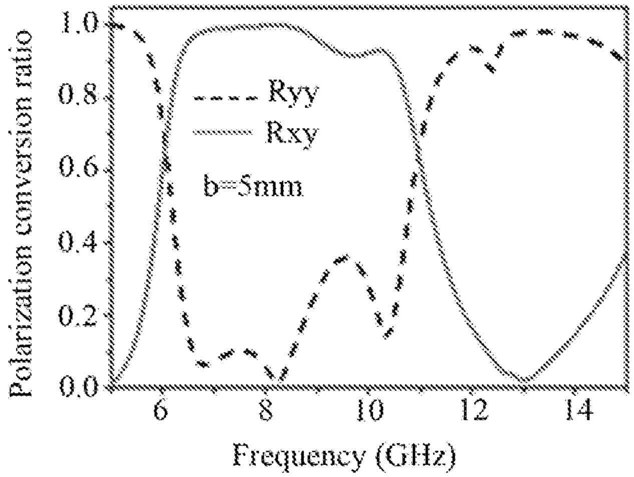
FIG. 17 is a polarization conversion ratio simulation graph of a polarization conversion structure according to an exemplary embodiment of the present disclosure.
Figure 18:
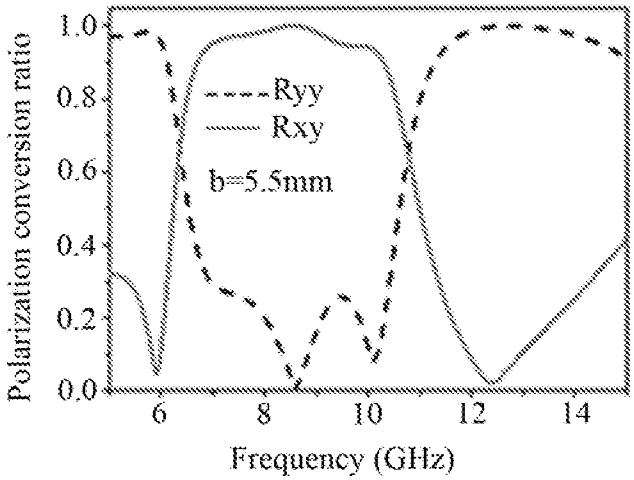
FIG. 18 is a polarization conversion ratio simulation graph of a polarization conversion structure according to an exemplary embodiment of the present disclosure.
Figure 19:
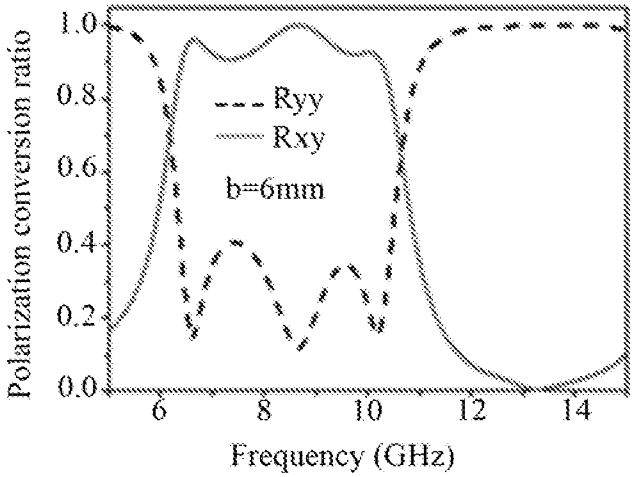
FIG. 19 is a polarization conversion ratio simulation graph of a polarization conversion structure according to an exemplary embodiment of the present disclosure.

FIG. 15 to FIG. 19 are schematic diagrams of simulation results of polarization conversion ratio in a structure in which the side length b (the side length of the radiation structure 31 extending in the second direction Y) of the short side of the radiation structure 31 in FIG. 1 is 4 mm to 6 mm. FIG. 15 is a schematic diagram of a simulation result of the polarization conversion ratio when the side length b (the side length of the radiation structure 31 extending in the second direction Y) of the short side of the radiation structure 31 in FIG. 1 is 4 mm. FIG. 16 is a schematic diagram of a simulation result of the polarization conversion ratio when the side length b (the side length of the radiation structure 31 extending in the second direction Y) of the short side of the radiation structure 31 in FIG. 1 is 4.5 mm. FIG. 17 is a schematic diagram of a simulation result of the polarization conversion ratio when the side length b (the side length of the radiation structure 31 extending in the second direction Y) of the short side of the radiation structure 31 in FIG. 1 is 5 mm. FIG. 18 is a schematic diagram of a simulation result of the polarization conversion ratio when the side length b (the side length of the radiation structure 31 extending in the second direction Y) of the short side of the radiation structure 31 in FIG. 1 is 5.5 mm. FIG. 19 is a schematic diagram of a simulation result of the polarization conversion ratio when the side length b (the side length of the radiation structure 31 extending in the second direction Y) of the short side of the radiation structure 31 in FIG. 1 is 6 mm. As can be seen from FIGS. 13 to 19, good polarization conversion performance can be achieved when the value of b is in the range of 3 mm to 6 mm. As the side length b (the side length of the radiation structure 31 extending in the second direction Y) of the short side of the radiation structure 31 changes from 4 mm to 6 mm, the polarization conversion ratio gradually decreases and the performance gradually deteriorates in the structure with the value of b gradually increasing in the range of 4 mm to 6 mm.

In an exemplary embodiment, both the frequency band of polarization conversion and the intensity of the reflection coefficient may fluctuate when the line width w of the resonant structure 32 changes, and the reflection coefficient and the frequency bandwidth can be adjusted by adjusting the line width w of the resonant structure 32.

In the exemplary embodiment, as can be seen from the above and from FIGS. 11$a$ to 19, the performance of the polarization conversion structure can be evaluated using the polarization conversion ratio (PCR) and reflection coefficient. If the incident wave is polarized along the Y-axis, the polarization conversion ratio PCR and reflection coefficient are calculated as follows:

$$PCR = \frac{|R_{XY}|^2}{|R_{XY}|^2 + |R_{yy}|^2};$$

PCR is polarization conversion ratio, $R_{xy}=|E_{rx}|/|E_{iy}|$, $R_{yy}=|E_{ry}|/|E_{iy}|$, $R_{xy}$ and $R_{yy}$ are the reflection coefficients of cross polarization and main polarization respectively, $E_{rx}$ is the reflection electric field along the X-axis, $E_{iy}$ is the incident electric field along the Y-axis, and $E_{ry}$ is the reflection electric field along the Y-axis. In an exemplary embodiment, as can be seen from the polarization conversion ratio calculation formula, the polarization conversion ratio PCR is used to evaluate the ratio of conversion from an incident electric field on the Y-axis to a reflection electric field on the X-axis.

Figure 20:
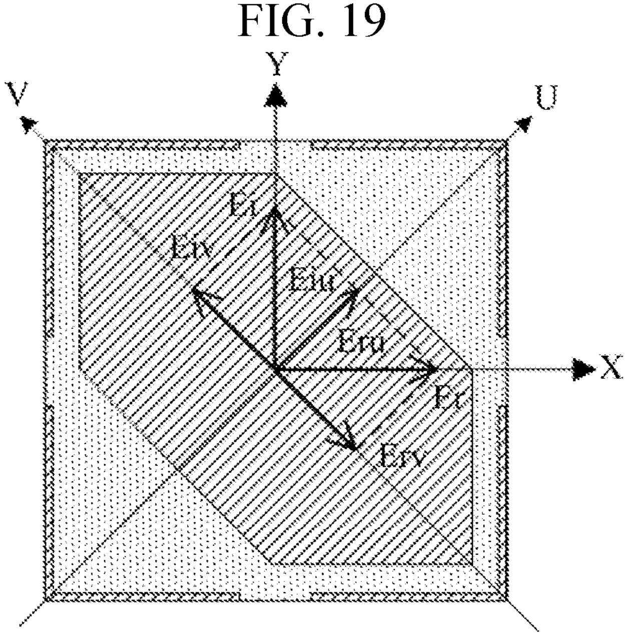
FIG. 20 is a schematic diagram of a polarization conversion principle of a polarization conversion structure according to an exemplary embodiment of the present disclosure.

In an exemplary embodiment, as shown in FIG. 20, which is a schematic diagram of polarization conversion principle, Ei (i.e. $E_{iy}$) is the electric field incident along the Y-axis direction, and Er (i.e. $E_{rx}$) is the electric field reflected along the X-axis direction.

An embodiment of the present disclosure further provides an antenna, which includes the polarization conversion structure described in any of the above embodiments.

Figure 21:
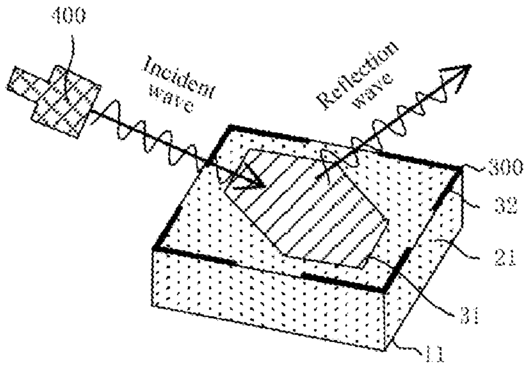
FIG. 21 is a schematic diagram of a structure of an antenna according to an exemplary embodiment of the present disclosure.

In an exemplary embodiment, as shown in FIG. 21, the antenna may further include a feed 400, which may include a ground structure layer 11, a first dielectric substrate 21, and a radiation structure layer 300 stacked in a direction perpendicular to the plane where the polarization conversion structure is located. The feed 400 is arranged at a side of the radiation structure layer away from the first dielectric substrate 21. The polarization conversion structure is configured to receive electromagnetic waves (which can be understood as incident waves) from the feed 400, polarize the electromagnetic waves, and reflect the polarized electromagnetic waves, which belongs to a reflection operation mode. In this application state, it may be applied to polarize the electromagnetic wave signals from the feed 400. The electromagnetic waves emitted by the feed 400 may be emitted by other antennas, or the feed 400 may be a separate antenna structure, and the polarization conversion structure performs polarization conversion on electromagnetic waves emitted by another antenna structure serving as the feed 400. In the antenna structure shown in FIG. 21, the polarization conversion structure may be the same as the polarization conversion structure described in any of the above embodiments.

Figure 22:
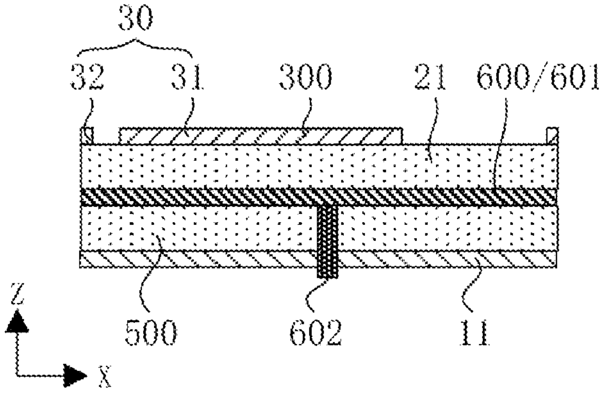
FIG. 22 is a schematic diagram of a sectional structure of an antenna according to an exemplary embodiment of the present disclosure.

In an exemplary embodiment, as shown in FIG. 22, the antenna may further include a second dielectric substrate 500 and a feed structure layer 600, and in a direction perpendicular to the plane where the antenna is located, the polarization conversion structure may include a ground structure layer 11, a first dielectric substrate 21, and a radiation structure layer 300 which are stacked. The second dielectric substrate 500 and the feed structure layer 600 are located between the ground structure layer 11 and the first dielectric substrate 21, and the feed structure layer 600 is located at a side of the second dielectric substrate 500 away from the ground structure layer 11.

In an exemplary embodiment, as shown in FIG. 22, the antenna may further include at least one coaxial conductive structure 602, the radiation structure layer 300 may include at least one radiation unit 30, and the feed structure layer 600 may include at least one feed structure 601 electrically connected to the ground structure layer 11 through the at least one coaxial conductive structure 602.

At least one feed structure 601 corresponds to at least one radiation unit 30, and an orthographic projection of the feed structure 601 on the first dielectric substrate 21 overlaps at least partially with an orthographic projection of the corresponding radiation unit 30 on the first dielectric substrate 21.

Figure 23:
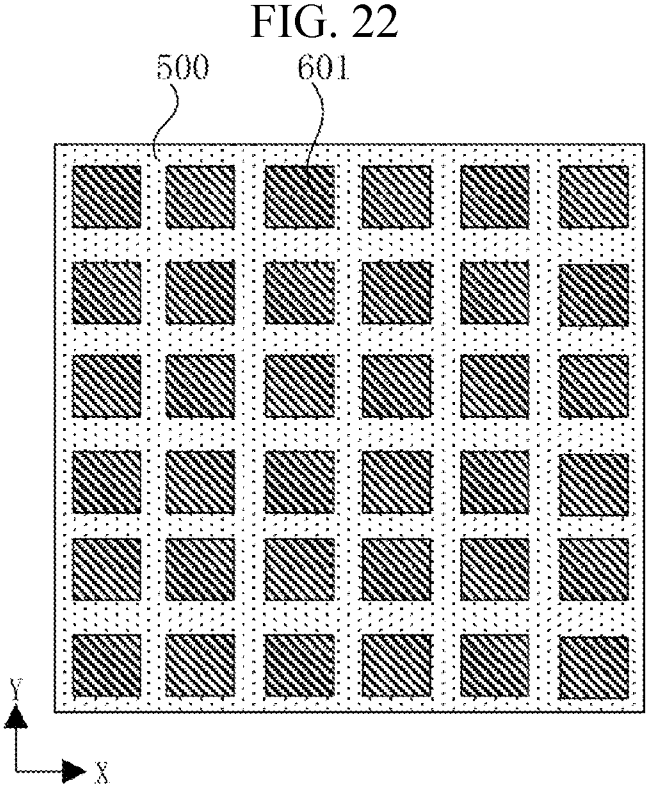
FIG. 23 is a schematic diagram of a planar structure of a feed structure layer in an antenna according to an exemplary embodiment of the present disclosure.
Figure 24:
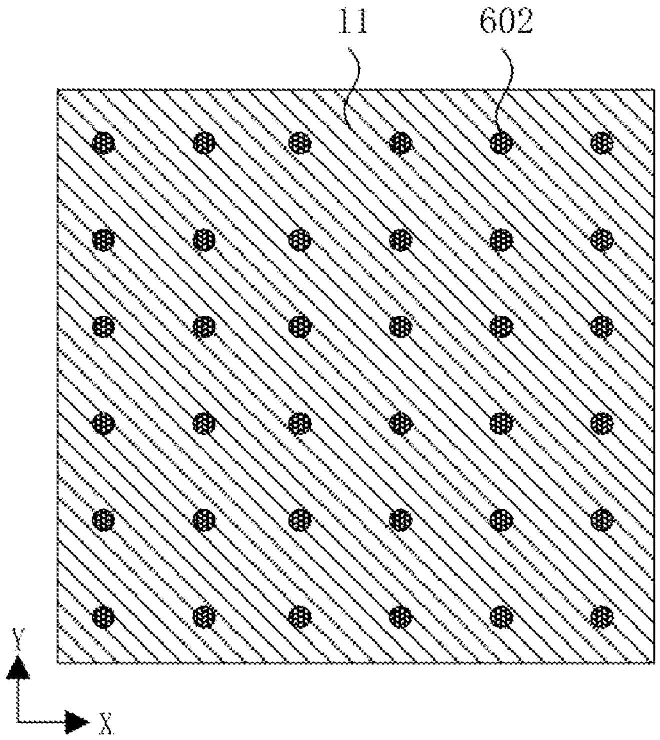
FIG. 24 is a schematic diagram of a planar structure of a ground structure layer in an antenna according to an exemplary embodiment of the present disclosure.

In an exemplary embodiment, FIG. 22 shows a polarization conversion structure including one radiation unit 30, corresponding to a feed structure 601 and a coaxial conductive structure 602. In a structure in which the polarization conversion structure includes multiple arrays of radiation units 30, there are multiple corresponding arrays of feed structures 601 and multiple coaxial conductive structures 602. FIG. 23 shows a schematic diagram of a planar structure of the feed structure layer 600 corresponding to the polarization conversion structure in FIG. 9, and FIG. 24 shows a schematic diagram of a planar structure of the ground structure layer 11 corresponding to the feed structure layer 600 in FIG. 23. In an exemplary embodiment, the coaxial conductive structure 602 may be a coaxial feed probe or a coaxial conductive post. In an exemplary embodiment, one terminal of the coaxial conductive structure 602 is connected to the feed structure layer 600, and the other terminal extends to a side of the ground structure layer 11 away from the second dielectric substrate 500, and is configured to receive electromagnetic waves and transmit the received electromagnetic waves to a corresponding feed structure 601 in the feed structure layer 600, the feed structure 601 feeds the electromagnetic waves into a corresponding radiation unit 30 in the radiation structure layer 300. In an exemplary embodiment, the polarization conversion structure may be the polarization conversion structure described in any of the above embodiments.

In an exemplary embodiment, the operating mode of the antenna shown in FIG. 22 may adopt a transmissive operating mode (the electromagnetic wave received by the coaxial conductive structure 602 is acquired in a transmissive manner, and the electromagnetic wave is polarized), and the operating mode of the antenna shown in FIG. 21 may adopt a reflective operating mode (the electromagnetic wave transmitted by the feed 400 is acquired in a reflective manner, and the electromagnetic wave is polarized).

In the polarization conversion structure according to an embodiment of the present disclosure, the radiation unit and the ground structure layer are respectively arranged at both sides of the first dielectric layer, the radiation structure in the radiation unit is symmetrically arranged relative to the first centerline, and has the characteristics of simple structure, easy to process, low profile and small volume on the premise of higher conversion ratio.

The drawings of the embodiments of the present disclosure only involve structures involved in the embodiments of the present disclosure, and other structures may refer to a general design.

The embodiments of the present disclosure, that is, features in the embodiments, may be combined with each other to obtain a new embodiment in a situation of no conflict.

Although the implementations disclosed in the embodiments of the present disclosure are described above, the described contents are only implementations used for facilitating understanding of the embodiments of the present disclosure, but are not intended to limit the embodiments of the present disclosure. Any person skilled in the art to which the embodiments of the present disclosure pertain may make any modifications and variations in forms and details of implementation without departing from the spirit and the scope disclosed in the embodiments of the present disclosure. Nevertheless, the scope of patent protection of the embodiments of the present disclosure shall still be subject to the scope defined by the appended claims.

The invention claimed is:

1. A polarization conversion structure, comprising a ground structure layer, a first dielectric substrate and a radiation structure layer which are stacked in a direction perpendicular to a plane where the polarization conversion structure is located; wherein the radiation structure layer comprises at least one radiation unit, the radiation unit comprises a radiation structure, the radiation structure is symmetrical with respect to a first centerline, and the first centerline is a centerline of the radiation structure extending in a fourth direction on a plane parallel to the polarization conversion structure; and orthographic projections of the radiation unit and the ground structure layer on the first dielectric substrate are at least partially overlapped, wherein the radiation unit further comprises a resonant structure spaced apart from the radiation structure, the resonant structure is located around the radiation structure to form an annular structure, the resonant structure comprises a resonant opening, and the annular structure is disconnected at a position of the resonant opening, wherein a shape of an outer contour of the resonant structure is a square, and resonant openings are located at at least one set of opposite corners of the square, or the resonant openings are located at at least one set of opposite sides of the square; on a plane parallel to the polarization conversion structure, a set of opposite sides of the resonant structure extend in a first direction and another set of opposite sides of the resonant structure extend in a second direction, the resonant structure is symmetrical with respect to a third centerline and a fourth centerline, wherein the third centerline is a centerline of the resonant structure extending in the first direction and the fourth centerline is a centerline of the resonant structure extending in the second direction, wherein, the first direction, the second direction and the fourth direction intersect with each other, wherein a plurality of radiation structures among the plurality of radiation units are arranged in a uniform manner, wherein the polarization conversion structure is shaped as a square, the polarization conversion structure comprises a first sub-array to a fourth sub-array defined by a ninth centerline and a tenth centerline, a plurality of radiation structures located in the first sub-array is arranged in a same manner with a plurality of radiation structures located in a third sub-array, a plurality of radiation structures located in a second sub-array is arranged in a same manner with a plurality of radiation structures located in the fourth sub-array, on a plane parallel to the polarization conversion structure, one set of opposite sides of the polarization conversion structure extend in the first direction and another set of opposite sides of the polarization conversion structure extend in the second direction, the ninth centerline is a centerline of the polarization conversion structure extending in the first direction, and the tenth centerline is a centerline of the polarization conversion structure extending in the second direction, wherein the first direction, the second direction, a third direction intersect with the fourth direction, wherein the plurality of radiation units are disposed symmetrically with respect to the ninth centerline, the tenth centerline, a seventh centerline, and an eighth centerline, the seventh centerline is a centerline of the polarization conversion structure extending in the third direction and the eighth centerline is a centerline of the polarization conversion structure extending in the fourth direction on a plane parallel to the polarization conversion structure.

2. The polarization conversion structure according to claim 1, wherein in a structure in which the resonant openings are located at at least one set of opposite corners or two sets of opposite sides of the square, the resonant structure is symmetrical with respect to a fifth centerline and a sixth centerline, on a plane parallel to the polarization conversion structure, the fifth centerline is a centerline of the resonant structure extending in the fourth direction, the sixth centerline is a centerline of the resonant structure extending in a third direction, the fifth centerline coincides with the first centerline, and the third direction intersects with the first direction, the second direction, and the fourth direction.

3. The polarization conversion structure according to claim 1, wherein the radiation structure is also symmetrical with respect to a second centerline, on a plane parallel to the polarization conversion structure, the second centerline is a centerline of the radiation structure extending in a third direction, wherein the third direction intersects with the first direction, the second direction, and the fourth direction.

4. The polarization conversion structure according to claim 3, wherein the radiation structure is a polygonal structure, and the first centerline coincides with a diagonal line of the polygonal structure extending in the fourth direction.

5. The polarization conversion structure according to claim 4, wherein the radiation structure is shaped as a hexagon, the hexagon comprises a first set of opposite sides, a second set of opposite sides, and a third set of opposite sides, two sides of each set of opposite sides are parallel to each other, the first set of opposite sides extend in the first direction, the second set of opposite sides extend in the second direction, and the third set of opposite sides extend in the fourth direction.

6. The polarization conversion structure according to claim 5, wherein the annular structure has a line width of 0.1 mm to 0.4 mm;

a size of the radiation structure along the first direction is equal to a size along the second direction, both of which are 5 mm to 7 mm;

side lengths of two sides in the first set of opposite sides are equal to side lengths of two sides in the second set of opposite sides, both of which are 2 mm to 6 mm.

7. The polarization conversion structure according to claim 4, wherein the radiation structure has a double arrow shape, the double arrow shape comprises two isosceles right triangles and a rectangle connecting the two isosceles right triangles as a whole, a set of opposite sides of the rectangle are respectively connected to bottom sides of the two isosceles right triangles, a centerline of the rectangle extending along the fourth direction and angular bisectors of two right angles of the two isosceles right triangles coincide with the first centerline.

8. The polarization conversion structure according to claim 3, wherein the radiation structure is shaped as a diamond, a diagonal line of the diamond coincides with the third centerline, and another diagonal line of the diamond coincides with the fourth centerline.

9. The polarization conversion structure according to claim 3, wherein the radiation structure is formed by setting concave curved notches of a square radiation patch at a set of diagonal positions at two sides of the first centerline; or, the radiation structure is formed by setting concave curved notches of a circular radiation patch at opposite positions of two sides of the first centerline; or, the radiation structure is formed by setting fan-shaped notches of a circular radiation patch at opposite positions of two sides of the first centerline.

10. The polarization conversion structure according to claim 1, wherein a length of the radiation unit in an arrangement direction is: p=a+2*d+2*w;

wherein, p is a length of the radiation unit along the arrangement direction, w is a line width of the resonant structure, a is a length of the radiation structure along the arrangement direction, and d is a distance between opposite side surfaces of the resonant structure and a corresponding radiation structure, wherein the length a of the radiation structure in the arrangement direction is 5 mm to 7mm, the line width w of the resonant structure is 0.1 mm to 0.4 mm, the distance d between opposite side surfaces of two adjacent radiation units is 0.1 mm to 0.4 mm, the length of the radiation unit along the arrangement direction is 5.2 mm to 8.6 mm, and a distance between two adjacent radiation units is half an operating wavelength.

11. An antenna comprising at least one polarization conversion structure according to claim 1.

12. The antenna according to claim 11, further comprising a feed, wherein the feed is disposed at a side of the radiation structure layer away from the first dielectric substrate, the polarization conversion structure is configured to receive an electromagnetic wave from the feed and polarize the received electromagnetic wave.

13. The antenna according to claim 11, further comprising a second dielectric substrate and a feed structure layer, wherein the second dielectric substrate and the feed structure layer are located between the ground structure layer and the first dielectric substrate, and the feed structure layer is located at a side of the second dielectric substrate away from the ground structure layer.

14. The antenna according to claim 13, further comprising at least one coaxial conductive structure, wherein the radiation structure layer comprises at least one radiation unit, the feed structure layer comprises at least one feed structure, and the at least one feed structure is electrically connected to the ground structure layer through the at least one coaxial conductive structure;

the at least one feed structure corresponds to the at least one radiation structure, and an orthographic projection of the feed structure on the first dielectric substrate is at least partially overlapped with an orthographic projection of a corresponding radiation structure on the first dielectric substrate.

* * * * *